J. SIMPSON & A. A. POPE.
TACKLE-BLOCKS.
Reissued Dec. 26, 1876.
No. 7,449.
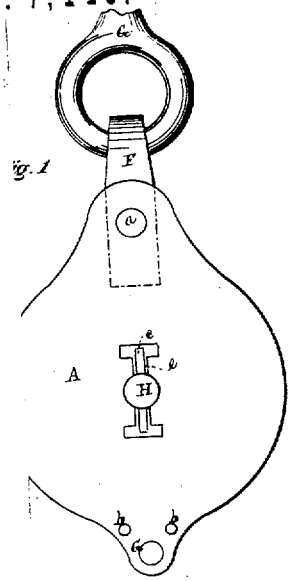
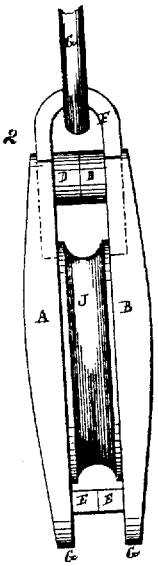
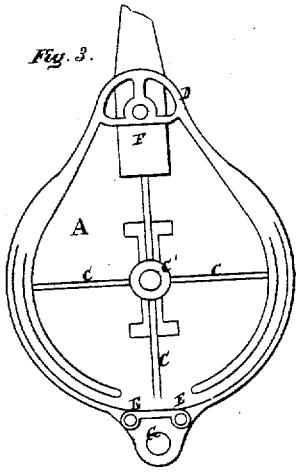
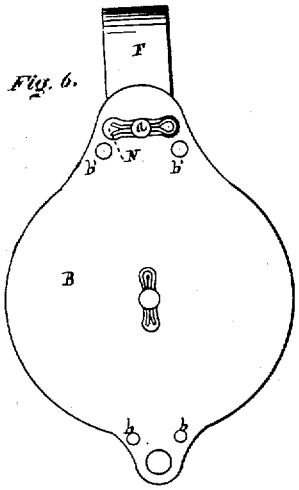
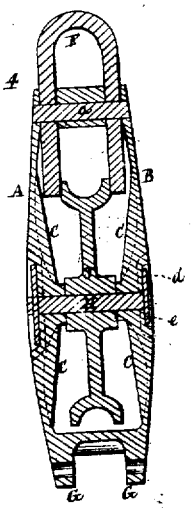
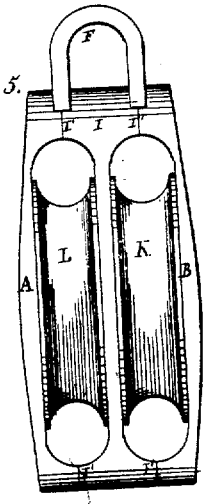
Witnesses
L. Mansfield
L. H. Burridge
Inventors.
John Simpson
A. A. Pope.
By Burridge & Co.
Attys
THE GRAPHIC CO. N.Y.

UNITED STATES PATENT OFFICE

JOHN SIMPSON AND ALFRED A. POPE, OF CLEVELAND, OHIO.

IMPROVEMENT IN TACKLE-BLOCKS.

Specification forming part of Letters Patent No. 180,162, dated July 25, 1876; reissue No. 7,449, dated December 26, 1876; application filed September 29, 1876.

*To all whom it may concern:*

Be it known that we, JOHN SIMPSON and ALFRED A. POPE, of Cleveland, in the county of Cuyahoga and State of Ohio, have invented a certain new and Improved Tackle-Block; and we do hereby declare that the following is a full, clear, and complete description thereof, reference being had to the accompanying drawings, making part of the same.

Figure 1 is a side view of a one-sheave tackle-block. Fig. 2 is a front view of Fig. 1. Fig. 3 is an inside view of one of the cheek-pieces. Fig. 4 is a vertical transverse section of Fig. 1. Fig. 5 is a front view of a two-sheave tackle-block. Fig. 6 is a side view of Fig. 5.

Like letters of reference refer to like parts in the several views.

The nature of this invention relates to certain improvements in metal tackle-blocks; and which consist in part of so constructing said blocks that the outer surface of the cheeks or shells thereof shall be free from projections, rendering them smooth and uniform in contour, thus avoiding chafing the ropes and rigging while in use. The improvement also consists in so attaching the strap to the block that said strap can be readily removed for certain purposes hereinafter specified; and also in forming, on the inner surfaces of the cheeks, bosses for supporting the hub of the sheaves against lateral thrust. It also relates to the employment of certain peculiar division-plates, by which, in their connection with the cheeks or shell of a single-sheave block, the block is made into a two or more sheave block without changing the otherwise essential construction of the block, by which, together with certain other improvements, the tackle-block is rendered strong and durable, substantially in the manner as follows, which is a full and complete description of the alleged improvement.

In the drawings, A and B represent the sides or cheeks of the blocks, which are concave on the inner, and convex on the outer, sides, of which Fig. 3 represents an inside view. C are webs for strengthening the cheeks, and C′ is a projecting boss on the inside of the shell, touching the hub of the sheave when in position, taking its side thrust or wear, thereby relieving the wear and friction at the outer edge of the sheave. This boss may vary in length of projection, to allow of various lengths of hubs or centers of sheaves. It also forms an increased bearing for the pin H. On the inner side of each upper end of the cheeks are formed projecting integral parts D, Fig. 2. These parts may be separate, and connected with the block between the cheeks for the same purpose, which form the parts of contact in putting the blocks together, and by a varied amount of projection form the different widths of space or mortise for various sizes or thickness of sheaves. Similar projections are on the lower end at E of the cheeks, or are substituted by becket or thimbles, answering the like purpose, the division-plate I, Fig. 5, having corresponding projections for similar purpose. From the top downward in the projectures D D, Fig. 2, is cast a mortise of a size to receive the ends of the strap F, whereby the ring G or hook is attached to the block. The ends of the strap are fitted in the mortises, and extend therein, as will be seen in Fig. 4. The strap is held by a pin or riveted rod, *a*, Fig. 4, and which also serves to secure the cheeks of the block to each other at that end. The lower end of the cheeks of the blocks are in like manner secured to each other by one or more rivets, *b b*, Fig. 1, passing through the projectures E E, immediately beneath which, in the ears G, may be secured a becket.

It will be observed, on examination of the drawings, that the cheeks A B and division-plate I, Fig. 5, serve as the connecting-links between the straps, carrying the hook at one end of the block and the becket at the other, supporting intermediately the burden on the sheave by the shaft H, entirely dispensing with straps extending along the outer or inner sides of the cheeks for these purposes, as is usually the case. The shaft H is secured in place by pins *c d*, one on either end, as shown in Fig. 4. Said pins are embedded in the cheeks so far as to be below or even with the surface. To accomplish this end a recess or gain, *e*, is made in each cheek-piece for the reception of the pins. (See Fig. 4.) In placing the shaft H in position the pin *d* is first inserted in the shaft, then pushed through, and pin

*c* bent and inserted, afterward having its ends set back in the recess, by which it is secured from coming out The pin *c* may be removed by prying up one end and pushing it out, thus allowing the removal of the shaft, &c. In place of pin *c*, held in position as described, it may be substituted by a split pin key, which is similarly embedded in recesses, to prevent chafing or wear. (See Fig. 6.) It sometimes occurs that, instead of a hook being attached by the strap F, a ring or other device, or, in some cases, no substitute at all, is wanted, as special uses may determine. Therefore, instead of riveting the pin *a*, securing the straps in the cheeks, it is retained therein by split key N, Fig. 6, which is also embedded in the cheek in a recess, so that it shall not be above the surface thereof. Hence, to effect the change of a hook for a ring, or for the removal of either, the split key is backed out, and the pin A and strap are taken out to effect the desired change, thus making the strap removable. In such case the upper end of the block is secured or fastened together by rivets *b′ b′*. The two sheave-blocks, Figs. 5 and 6, are similar in construction, differing therefrom chiefly by the addition thereto of the division-plate I inserted between the cheeks, creating two spaces for the accommodation of two sheaves, K and L. A three or four sheave block is made by the addition of similar division-plates to the plate I and sheaves, the replacing or placing of mortises for strap for hook being the chief change required. So far as the side plates or cheeks A and B are concerned, and the method of forming mortises for the sheaves and securing the several parts together forming the entire block, there is no substantial or material difference between that shown in Figs. 1 and 2 and that represented in Figs. 5 and 6, the latter having, in addition, the division-plate I, of which there may be one or more, according to the number of sheaves required in the block.

In the construction of the above-described blocks, the special object in view is to produce a metal block of one or more sheaves that shall have smooth cheeks or sides, having neither straps, bolts, pins, nor rivets above the surfaces—a block that shall be neat in appearance, strong and durable, and yet light, so that it may be as readily handled as those made of wood.

What we claim as our invention, and desire to secure by Letters Patent, is—

1. In tackle-blocks, the cheeks or side pieces A and B, having projectures D D cast or otherwise formed thereon, forming of the projectures and shell one entire piece of metal, substantially as described, provided with the gains or mortises for the strap F, for the purpose set forth.

2. The division plate I, having projectures I′ on both sides thereof, made or cast of one piece to form divisions between the sheaves in tackle-blocks, and provided with gains or mortises for strap F, and with the sides A and B, substantially as herein set forth.

3. The sides or cheek-pieces having the projectures D D, provided with mortises or gains for the reception of the ends of the strap F, in combination with said strap and the cheeks A and B of the block, substantially as and for the purpose set forth.

4. The cheeks A and B, provided with openings for the shaft H, and with gains or recesses *e e′* for the pins *c* and *d*.

5. The cheeks or side pieces A and B, formed with the bosses C′ C′, for the purpose of providing lateral bearings for the pulley-hub, as set forth.

6. The pin *a*, secured in position by the key in recess N, Fig. 6, in combination with strap F and shells A and B, substantially as and for the purpose set forth.

JOHN SIMPSON.
ALFRED A. POPE.

Witnesses:
J. H. BURRIDGE,
E. W. CROSS.